United States Patent
Lipot et al.

(10) Patent No.: US 11,097,728 B2
(45) Date of Patent: Aug. 24, 2021

(54) LONGITUDINAL DRIVER ASSISTANCE SYSTEM IN A HYBRID VEHICLE

(71) Applicant: Bayerische Motoren Werke Aktiengesellschaft, Munich (DE)

(72) Inventors: Norbert Lipot, Ismaning (DE); Stefan Weindl, Munich (DE); Mark Van Gelikum, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 93 days.

(21) Appl. No.: 16/517,729

(22) Filed: Jul. 22, 2019

(65) Prior Publication Data
US 2020/0031346 A1    Jan. 30, 2020

(30) Foreign Application Priority Data
Jul. 26, 2018 (DE) ...................... 10 2018 212 519.8

(51) Int. Cl.
*B60W 30/14* (2006.01)
*B60W 20/20* (2016.01)
*B60W 50/038* (2012.01)

(52) U.S. Cl.
CPC .......... *B60W 30/143* (2013.01); *B60W 20/20* (2013.01); *B60W 50/038* (2013.01);
(Continued)

(58) Field of Classification Search
CPC .. B60W 30/143; B60W 20/20; B60W 50/038; B60W 2420/42; B60W 2555/60;
(Continued)

(56) References Cited

U.S. PATENT DOCUMENTS 9,506,767 B2 * 11/2016 Naumann ............. B60W 20/15
10,513,252 B2 * 12/2019 Wiesbeck ................ B60K 6/26
(Continued)

FOREIGN PATENT DOCUMENTS

DE    10 2012 211 967 A1    1/2014
DE    10 2014 209 687 A1    11/2015
(Continued)

OTHER PUBLICATIONS

German-language Search Report issued in counterpart German Application No. 10 2018 212 519.8 dated Apr. 12, 2019 with partial English translation (13 pages).

*Primary Examiner* — Jason Holloway
(74) *Attorney, Agent, or Firm* — Crowell & Moring LLP

(57) ABSTRACT

A longitudinal driver assistance system, in a hybrid vehicle equipped with at least one electric drive motor, one internal combustion engine and one electronic drive control unit which actuates said motor and engine, includes: a detection system for the predictive detection of an event which, starting from an actual speed, leads to the specification of an increased setpoint speed at a specified location-dependent time, and a function unit which is configured to specify a setpoint acceleration profile to the increased setpoint speed and to output it to the drive control unit for generating a motor/engine torque which is necessary to reach the setpoint acceleration profile. The function unit is also configured to receive, when a defined condition applies, a limiting maximum possible motor/engine torque from the drive control unit, which motor/engine torque is not sufficient to reach the setpoint acceleration profile, and to specify a changed setpoint acceleration profile on the basis thereof.

2 Claims, 2 Drawing Sheets

(52) U.S. Cl.
CPC ..... *B60W 2420/42* (2013.01); *B60W 2552/30* (2020.02); *B60W 2555/60* (2020.02); *B60W 2556/50* (2020.02); *B60W 2720/103* (2013.01); *B60W 2720/106* (2013.01)

(58) Field of Classification Search
CPC ......... B60W 2552/30; B60W 2556/50; B60W 2720/103; B60W 2720/106
See application file for complete search history.

(56) References Cited

U.S. PATENT DOCUMENTS

| | | | |
|---|---|---|---|
| 2007/0282513 A1* | 12/2007 | Michi | B60W 40/02 |
| | | | 701/96 |
| 2011/0112708 A1* | 5/2011 | Fassnacht | B60W 10/08 |
| | | | 701/22 |
| 2016/0082947 A1 | 3/2016 | Naumann et al. | |
| 2017/0015319 A1 | 1/2017 | Knoller | |
| 2018/0265069 A1 | 9/2018 | Wiesbeck et al. | |
| 2018/0265070 A1* | 9/2018 | Wiesbeck | F02N 11/0822 |

FOREIGN PATENT DOCUMENTS

| | | |
|---|---|---|
| DE | 10 2015 202 216 A1 | 3/2016 |
| DE | 10 2015 213 181 B3 | 1/2017 |
| DE | 10 2015 223 588 A1 | 6/2017 |

* cited by examiner

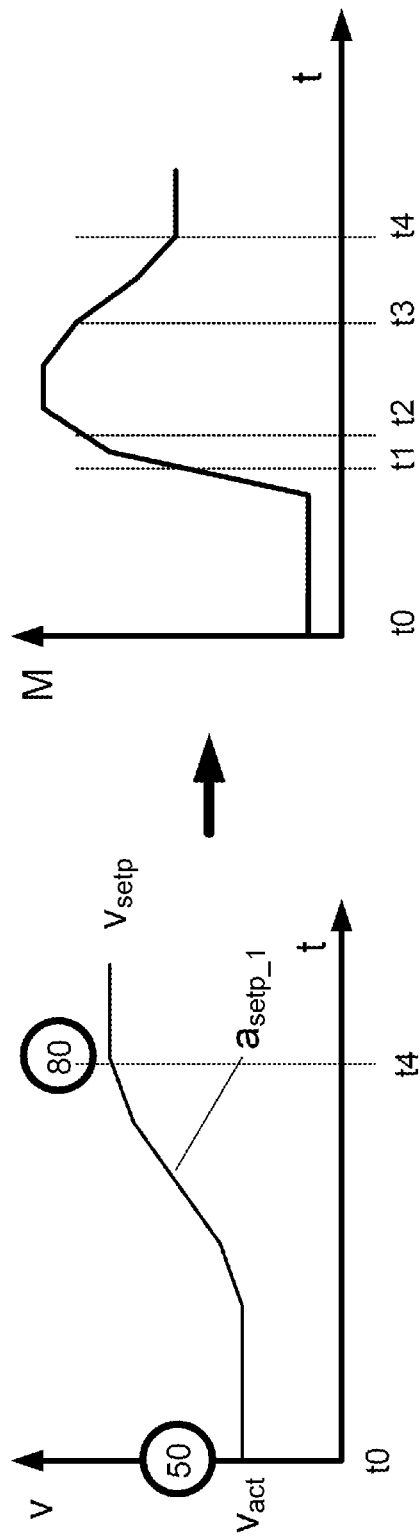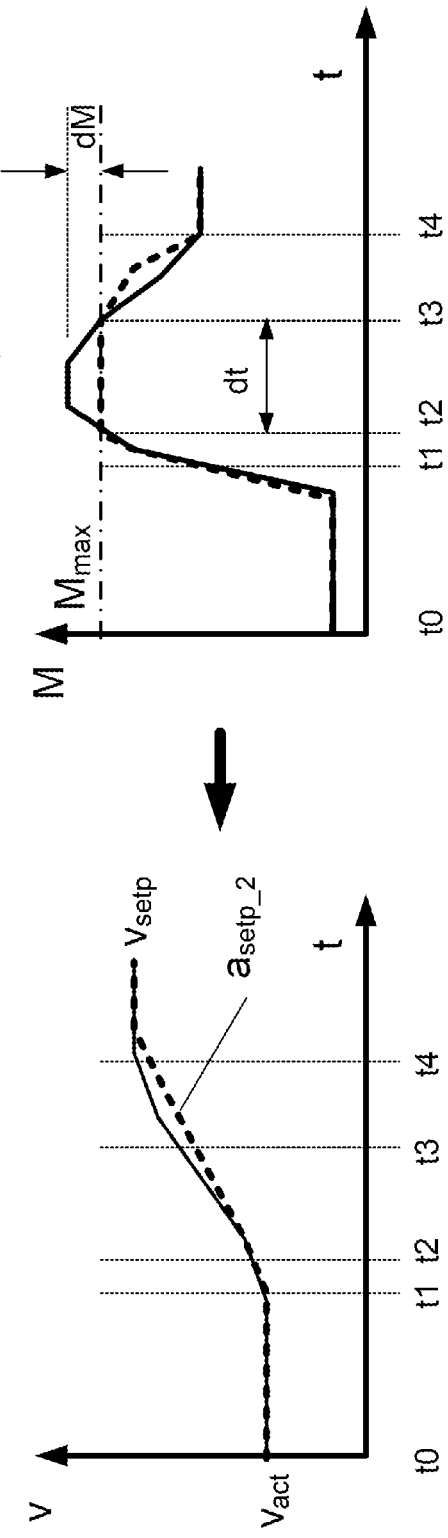

LONGITUDINAL DRIVER ASSISTANCE SYSTEM IN A HYBRID VEHICLE

CROSS REFERENCE TO RELATED APPLICATION

This application claims priority under 35 U.S.C. § 119 from German Patent Application No. 10 2018 212 519.8, filed Jul. 26, 2018, the entire disclosure of which is herein expressly incorporated by reference.

BACKGROUND AND SUMMARY OF THE INVENTION

The invention relates to a longitudinal driver assistance system in the automated longitudinal guidance mode (e.g. when the cruise control system is activated) in a hybrid vehicle.

Basically, a large number of longitudinal driver assistance systems which are configured as cruise control systems are already known, which systems regulate the speed of a motor vehicle to a specified setpoint speed or maximum permissible maximum speed or to a target object traveling ahead (e.g. cruise controller or BMW "Active Cruise Control" ACC).

DE 10 2012 211 967 A1 describes a combination of a speed-limiting system and a cruise control system, wherein the maximum permissible maximum speed of the speed-limiting system can be adopted, instead of the set speed which has been set, as a (new) setpoint speed or target speed for the cruise control.

DE 10 2015 223 588 A1 discloses a situation-adaptive predictive operating strategy for a hybrid vehicle in the manual, that is to say non-automatic, longitudinal guidance mode.

Finally, DE 10 2015 213 181 B3 discloses for example a driver assistance system which can detect a speed limit predictively either from map data of a navigation system and/or by image processing and can continuously display said speed limit to the driver from the point when the speed limit is reached, so that the driver can independently adapt his speed to the speed limit where necessary (e.g. BMW Speed Limit Assist or BMW Efficient Dynamic Pilot).

The longitudinal driver assistance system for a motor vehicle, known from DE 10 2015 213 181 B3, comprises essentially a detection system for detecting currently valid events or upcoming relevant events which require a change to the maximum permissible maximum speed, a second detection system which can be part of the first detection system or else can be identical thereto, for detecting the route profile which is to be traveled through, and a function unit which, when a relevant currently valid event or upcoming relevant event is detected, determines a location-dependent time, while taking into account the location of the relevant event (and if appropriate further necessary information such as e.g. a determined maximum permissible speed at the location of the relevant event, the differential speed between the vehicle and the determined new maximum permissible speed, detected free travel or follow-on travel, current or approved decelerating operating modes of the vehicle such as e.g. sailing mode, thrust mode, braking mode). At the reaching of the location-dependent time, the function unit brings about automatic adaptation of the currently maximum permissible maximum speed or the outputting of a request message for approving automatic adaptation of the currently maximum permissible maximum speed to a new maximum permissible maximum speed.

If an upcoming event is detected in good time, a deceleration strategy of the vehicle for reaching the determined maximum permissible maximum speed (at least approximately) at the location of the relevant event is therefore ideally determined. The location-dependent time which is to be determined and at which the automatic adaptation of the currently maximum permissible maximum speed or the outputting of a request message for approving automatic adaptation of the currently maximum permissible maximum speed to a new maximum permissible maximum speed is brought about is then obtained on the basis of the determined deceleration strategy.

The object of the invention is to improve a longitudinal driver assistance system for a hybrid vehicle in the automatic longitudinal guidance mode with respect to the comfort and the consumption.

This and other objects are achieved by a longitudinal driver assistance system in a hybrid vehicle which comprises at least one electric drive motor, one internal combustion engine and one electronic drive control unit which actuates the motor and engine, wherein the driver assistance system comprises the following components:

a detection system for the predictive detection of an event which, starting from an actual speed, leads to the specification of an increased setpoint speed at a specified location-dependent time, and a function unit which is configured to specify a setpoint acceleration profile to the increased setpoint speed and to output it to the drive control unit for generating a motor/engine torque or a torque profile which is necessary to reach the setpoint acceleration profile, wherein the function unit is also configured to receive, when a defined condition applies, a limiting maximum possible motor/engine torque or a profile of a limiting maximum possible motor/engine torque (in particular as a function of the rotational speed, the gradient, etc.) from the drive control unit, which motor/engine torque or profile is not sufficient to reach the setpoint acceleration profile, and to specify a changed setpoint acceleration profile on the basis thereof.

That is to say the longitudinal dynamics profile which is planned by the ACC system is adapted or optimized on the basis of information or limitations from the operating strategy, the comfort requirements of the driver, etc., with the objective of increasing the comfort and/or the overall efficiency.

In addition, it is mentioned that the setpoint acceleration profile is also referred to as trajectory planning.

The defined condition is preferably a prevention rule for the non-activation of the internal combustion engine, in particular if an operating mode with priority of the electric drive motor is activated.

The activation of the internal combustion engine is preferably prevented (prevention rule) if it has been predictively detected that the torque of the electric drive motor is almost sufficient to reach the setpoint acceleration profile (or analogously also the setpoint speed profile), and the internal combustion engine would have to be activated for only a small torque contribution and/or only for a comparatively short time period; i.e. the internal combustion engine would have to be briefly activated and immediately deactivated again. This can be undesirable for reasons of consumption and/or comfort.

The invention is based on the following considerations.

The interaction of the driver assistance system according to the invention with the drive control unit is intended to provide a situation-adaptive operating strategy for hybrid vehicles, which makes possible, in particular, emission-reducing and comfortable restarting and shutting off of the internal combustion engine. In this context, the increasing prediction and the increasing automated longitudinal guidance of the driver assistance systems are utilized. In particular, predictive longitudinal trajectories including the necessary torque profiles are optimized. By means of the invention it is, if appropriate, also possible to make a saving in terms of a separate restart system in hybrid vehicles, since the internal combustion engine has to be used less and less. It is at least contemplated for the restart system with respect to the configuration of the service to be able to be tailored to fewer restarts. The purely electric travel mode can be extended by the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2A shows an exemplary predictively specified setpoint acceleration profile (also referred to as a setpoint trajectory).

FIG. 2B shows an illustration of the drive torque profile which is necessary to reach the setpoint acceleration profile.

FIG. 2C shows a drive torque profile which is possible when a specified condition for limiting the drive torque applies.

FIG. 2D shows a changed setpoint acceleration profile.

DETAILED DESCRIPTION OF THE DRAWINGS

Figure 1:
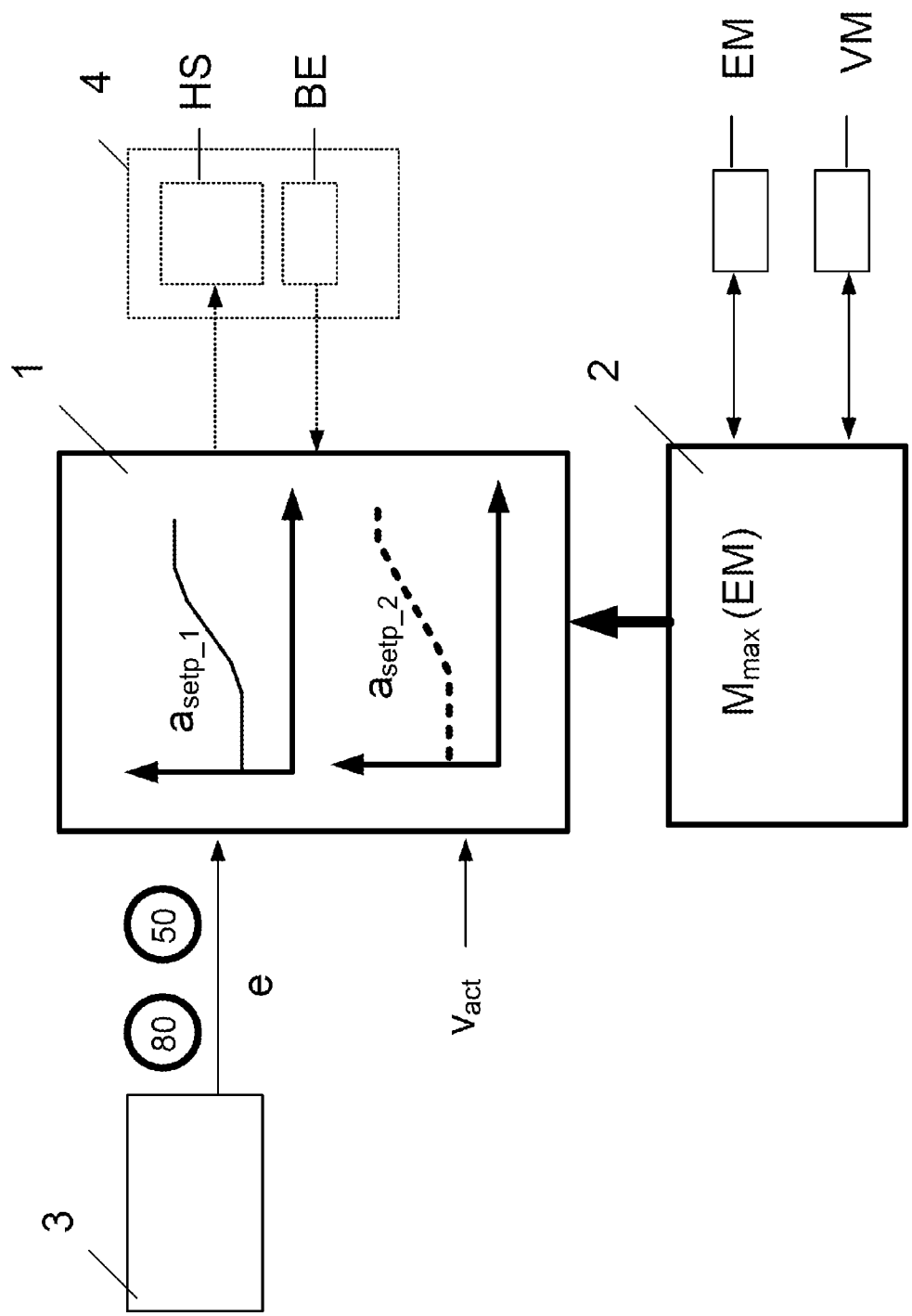
FIG. 1 shows an exemplary design of a longitudinal driver assistance system which is embodied as a cruise control system in a hybrid vehicle and has the purpose of regulating the speed to a setpoint speed.

FIG. 1 shows a schematic view of the following components in a hybrid vehicle which are essential to the implementation of the invention:
- an electric drive motor EM,
- an internal combustion engine VM,
- an electronic drive control unit 2 which actuates the motor EM and engine VM,
- a predictive detection system 3 which can be, for example, a navigation system with detectable additional information (e.g. about future road signs and/or place-name signs, as well as bends or freeway access roads),
- a display-operator control unit 4 with an indication system HS and an operator control element BE, and
- a function unit 1 which preferably contains a software module (computer program product) which is programmed according to the invention and is connected both to the detection system 3 and to the drive control unit 2.

The detection unit 3 is e.g. a map-based detection unit which detects, on the basis of available map data, the vehicle's own position and a known upcoming route section, events e which require adaptation of the setpoint speed (e.g. speed limit, roundabout, freeway exit, bend radii). The map-based detection unit 3 is configured in such a way that, on the one hand, it detects the location of the upcoming relevant event (e.g. reaching of a roundabout, a freeway exit or a sharp bend), that is to say also the level of the maximum permissible setpoint speed which applies from this location, and transfers it to the function unit 1 as the location-dependent time—here an increase in speed from 50 km/h to 80 km/h at the time t4.

In addition, the detection unit 3 can also be camera-based so that upcoming, speed-limiting events, which possibly require adaptation of the setpoint speed, can also be detected on the basis of the data of a sensor system (e.g. video sensor system) which is directed forward.

The function unit 1 can output to the driver a corresponding signal through a display-operator control unit 4 which includes an indication system HS and an operator control element BE. The driver assistance system according to the invention is activated by means of the operator control element BE and serves, for example, for specifying a set speed which can basically be assumed to be a setpoint speed, but which can also be partially changed by the prediction by way of the detection unit 3. The speed can be changed automatically only after the inputting of an approval confirmation or can be changed fully automatically.

The invention will also be explained in yet more detail below with reference to FIGS. 2A to 2D.

In the present exemplary embodiment, the detection system 3 predictively detects, at the time to, an event e which, starting from an actual speed of 50 km/h here, leads to the specification of an increased setpoint speed of 80 km/h here at the location-dependent time t4. This event can be detectable, for example, by way of an upcoming road sign which is stored in a navigation system with an activated route guidance system and which indicates the canceling of a preceding speed limit.

The function unit 1 then outputs a first setpoint acceleration profile $a_{setp\_1}$ (see also FIG. 2A) to the increased setpoint speed $v_{setp}$ from 80 km/h here to the drive control unit 2 for generating a motor/engine torque profile M which is necessary to reach the setpoint acceleration profile $a_{setp\_1}$ (FIG. 2B). This profile of the motor/engine torque M can be provided in a hybrid vehicle by way of the electric drive motor EM and/or the internal combustion engine VM. For example, in a selected economic driving mode an operating strategy with prioritized electric drive can be specified. The drive control unit 2 can therefore specify that the motor/engine torque M is provided as far as possible exclusively by way of the electric drive motor EM and that, as a result, a prevention rule for the non-activation of the internal combustion engine VM is to be complied with. However, in this context the following is to be kept in mind: if purely electric driving is to be carried out in any case, a mode is available in which the combustion engine either cannot be restarted at all or the restarting characteristic curve is raised to a correspondingly high level. However, in the present invention, a decision is made irrespective of the level of the restarting characteristic curve. Only short-term restarts are to be avoided if this is possible without a large deviation from the original planning.

Such a prevention rule can be, for example, the predictive detection of a torque contribution or torque portion dM of the internal combustion engine VM which is necessary only for a specified comparatively short time period dt. Additionally or alternatively, the prevention rule for the non-activation of the internal combustion engine VM can also be the predictive detection of a comparatively small necessary torque portion dM of the internal combustion engine VM.

Consequently, a condition can thus apply by which here—between the times t2 and t3—a limiting maximum possible motor/engine torque profile (dependent e.g. on the rotational speed, gradient, etc.) $M_{max}$ is to be received which is not sufficient to reach the setpoint acceleration profile $a_{setp\_1}$ because here the torque M is to be provided only with the electric drive motor EM (FIG. 2C—dashed line). At time t1, the change in the actual speed $V_{act}$ begins.

In this case, the function unit 1 therefore receives, from the drive control unit 2, the limiting maximum possible motor/engine torque $M_{max}$ which is not sufficient to reach the setpoint acceleration profile $a_{setp\_1}$, and specifies a changed setpoint acceleration profile $a_{setp\_2}$ (FIG. 2D-dashed line) on the basis thereof.

For the sake of completeness, it is to be finally mentioned that the longitudinal driver assistance system according to the invention can be used not only for cruise control systems but also for other types of assistance for the driver during longitudinal guidance. It is therefore possible for the longitudinal driver assistance system also to be embodied, for example, as a speed-limiting system in which a maximum permissible limit speed can be specified, and the function unit is configured to prevent the specified or set maximum permissible speed from being exceeded as a result of corresponding actuation of the drive.

The invention provides advantages in terms of comfort and/or efficiency.

If dt and dM are comparatively large, a situation-adaptive operating strategy can be used according to which the restart (if it will take place anyway) should be brought forward.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A longitudinal driver assistance system in a hybrid vehicle equipped with at least one electric drive motor, one internal combustion engine and one electronic drive control unit which actuates said motor and engine, the driver assistance system comprising:
    a detection system for predictive detection of an event which, starting from an actual speed, leads to a specification of an increased setpoint speed at a specified location-dependent time; and
    a function unit configured to:
        specify a setpoint acceleration profile to the increased setpoint speed,
        output the setpoint acceleration profile to the drive control unit for generating a motor/engine torque which is necessary to reach the setpoint acceleration profile,
        receive, when a prevention rule for non-activation of the internal combustion engine applies, a limiting maximum possible motor/engine torque or a profile of a limiting maximum possible motor/engine torque from the drive control unit, and
        specify a changed setpoint acceleration profile based on the limiting maximum possible motor/engine torque or the profile, wherein
            the limiting maximum possible motor/engine torque or profile is not sufficient to reach the setpoint acceleration profile, and
            the prevention rule is applied when a predictive detection of the torque contribution of the internal combustion engine necessary to reach the setpoint acceleration profile is specified for only a comparatively short time period with respect to a time period of the setpoint acceleration profile.

2. A longitudinal driver assistance system in a hybrid vehicle equipped with at least one electric drive motor, one internal combustion engine and one electronic drive control unit which actuates said motor and engine, the driver assistance system comprising:
    a detection system for predictive detection of an event which, starting from an actual speed, leads to a specification of an increased setpoint speed at a specified location-dependent time; and
    a function unit configured to:
        specify a setpoint acceleration profile to the increased setpoint speed,
        output the setpoint acceleration profile to the drive control unit for generating a motor/engine torque which is necessary to reach the setpoint acceleration profile,
        receive, when a prevention rule for non-activation of the internal combustion engine applies, a limiting maximum possible motor/engine torque or a profile of a limiting maximum possible motor/engine torque from the drive control unit, and
        specify a changed setpoint acceleration profile based on the limiting maximum possible motor/engine torque or the profile, wherein
            the limiting maximum possible motor/engine torque or profile is not sufficient to reach the setpoint acceleration profile, and
            the prevention rule is applied when a predictive detection of a torque contribution of the internal combustion engine necessary to reach the setpoint acceleration profile is comparatively small with respect to the motor/engine torque which is necessary to reach the setpoint acceleration profile.

* * * * *